(12) United States Patent
Long et al.

(10) Patent No.: US 12,473,246 B2
(45) Date of Patent: Nov. 18, 2025

(54) ETHANOL CONVERSION TO ISOBUTANOL

(71) Applicants: UOP LLC, Des Plaines, IL (US); CHINA PETROLEUM & CHEMICAL CORPORATION, Beijing (CN)

(72) Inventors: Richard Long, Katy, TX (US); Tian Ruan, Katy, TX (US); Jinbiao Guo, Katy, TX (US)

(73) Assignees: UOP LLC, Des Plaines, IL (US); China Petroleum & Chemical Corporation, Beijing (CN)

( * ) Notice: Subject to any disclaimer, the term of this patent is extended or adjusted under 35 U.S.C. 154(b) by 466 days.

(21) Appl. No.: 18/040,992

(22) PCT Filed: Sep. 25, 2020

(86) PCT No.: PCT/US2020/052734
§ 371 (c)(1),
(2) Date: Feb. 8, 2023

(87) PCT Pub. No.: WO2022/066167
PCT Pub. Date: Mar. 31, 2022

(65) Prior Publication Data
US 2023/0265029 A1    Aug. 24, 2023

(51) Int. Cl.
*C07C 29/34* (2006.01)
(52) U.S. Cl.
CPC .......... *C07C 29/34* (2013.01); *C07C 2521/04* (2013.01); *C07C 2521/10* (2013.01)

(58) Field of Classification Search
CPC . C07C 29/34; C07C 2521/04; C07C 2521/10; C07C 29/154; C07C 29/32
See application file for complete search history.

(56) References Cited

U.S. PATENT DOCUMENTS

| | | | |
|---|---|---|---|
| 5,493,064 A | 2/1996 | Vanderspurt et al. | |
| 5,559,275 A | 9/1996 | Barger | |
| 5,691,268 A | 11/1997 | Koveal et al. | |
| 5,703,133 A * | 12/1997 | Vanderspurt | C07C 29/154 |
| | | | 518/707 |
| 5,767,166 A | 6/1998 | Antonelli et al. | |

(Continued)

FOREIGN PATENT DOCUMENTS

| | | |
|---|---|---|
| BR | PI1106911 A2 | 9/2013 |
| CN | 101730674 A | 6/2010 |

(Continued)

OTHER PUBLICATIONS

An Wei et al., Mechanism of isobutanol formation in low-carbon alcohol synthesis and ways to improve its yield, Journal of Fuel Chemistry 01, 63-68, Feb. 15, 1994.

(Continued)

*Primary Examiner* — Deborah D Carr

(57) ABSTRACT

A process for isobutanol synthesis is described. Ethanol and synthesis gas (syngas) are reacted in the presence of a heterogeneous catalyst in a first reaction zone. The products of the first reaction can be separated into one or more streams comprising methanol and propanol. The methanol and propanol from the first reaction are reacted in the presence of a second catalyst to form isobutanol in a second reaction zone.

20 Claims, 2 Drawing Sheets

(56) References Cited

U.S. PATENT DOCUMENTS

| | | |
|---|---|---|
| 5,811,602 A | 9/1998 | Vanderspurt et al. |
| 7,705,192 B2 | 4/2010 | Kourtakis et al. |
| 9,266,807 B1 | 2/2016 | Norman et al. |
| 10,919,826 B2 | 2/2021 | Long et al. |
| 2009/0018371 A1 | 1/2009 | Klepper et al. |
| 2013/0225879 A1 | 8/2013 | Temel et al. |
| 2014/0171693 A1 | 6/2014 | Zhang et al. |
| 2020/0039905 A1 | 2/2020 | Long et al. |

FOREIGN PATENT DOCUMENTS

| | | | |
|---|---|---|---|
| CN | 102424646 A | 4/2012 | |
| CN | 103272609 A | 9/2013 | |
| CN | 103370295 A | 10/2013 | |
| CN | 106256815 A | 12/2016 | |
| CN | 108117480 A | 6/2018 | |
| CN | 109574798 A | 4/2019 | |
| CN | 106540681 B | 6/2019 | |
| CN | 110730768 A | 1/2020 | |
| JP | 2016079145 A | 5/2016 | |
| WO | WO-2019168527 A1 * | 9/2019 | ............. C07C 29/34 |

OTHER PUBLICATIONS

Office Action from ocrresponding Chinese application No. 202080103444.1, dated May 6, 2024.

International Preliminary Report on Patentability from corresponding PCT application No. PCT/US2020/052734, issued Mar. 28, 2023.

International Search Report from corresponding PCT application No. PCT/US2020/052734, mailed Jun. 22, 2021.

J.I. Di Cosimo et al., Structural Requirements and Reaction Pathways in Condensation Reactions of Alcohols on MgyAlOx Catalysts, Journal of Catalysis 190, 261-275 (2000).

Pellow, Katy J. et al., Towards the upgrading of fermentation broths to advanced biofuels: a water tolerant catalyst for the conversion of enthanol to isobutanol, Catalysis Science & Technology 7(21), pp. 5128-5134.10.1039/C7CY01553D file.

Kai A.N. Verkerk et al., Recent developments in isobutanol synthesis from synthesis gas, Applied Catalysis A: General 186 (1999) 407-431.

Written Opinion from corresponding PCT application No. PCT/US2020/052734, mailed Jun. 22, 2021.

* cited by examiner

ETHANOL CONVERSION TO ISOBUTANOL

This application is a U.S. National Phase under 35 U.S.C. § 371 of International Application No. PCT/US2020/052734 filed Sep. 25, 2020, which is incorporated herein by reference in its entirety.

BACKGROUND

Ethanol is used primarily as a gasoline additive for improving combustion efficiency. Isobutanol can be considered as a second-generation biofuel. Isobutanol is an organic solvent and a feedstock in the manufacturing of isobutyl acetate and isobutyl esters. It can also be blended directly with gasoline to improve octane number and combustion efficiency or used as a neat alternative fuel. Isobutanol has relatively higher energy density, and lower volatility compared to ethanol. In addition, it does not readily absorb water from air, preventing the corrosion of engines and pipelines. It also has a higher octane number than ethanol, resulting in less knocking in engines.

Although isobutanol has many potential uses, its synthesis is currently limited. Isobutanol can be produced through the carbonylation of propylene. This process involves reacting propylene with carbon monoxide and hydrogen to generate isobutyraldehyde, and then hydrogenating the isobutyraldehyde to isobutanol. For example, U.S. Pat. No. 2,564,130 discloses a process for the manufacture of n-butanol and isobutanol from a mixture containing propylene, CO, and $H_2$ at 225-300° C. in the presence of a cobalt-containing catalyst. Although this carbonylation process is currently used for manufacturing butanol, it is not energy efficient due to the high energy needed for the production of propylene and synthesis gas (syngas). It is also expensive because of the cost of propylene. Further, when isobutanol is used as a gasoline additive, demand for it is expected to increase the demand for propylene significantly, making the process even more expensive.

Alternatively, synthesis of isobutanol directly from more abundant and less-expensive syngas has been investigated extensively. The syngas, containing carbon monoxide and hydrogen, is mainly produced from reforming or partial oxidation of natural gas and light hydrocarbons, or gasification of coal and biomass at high temperatures. It can also be produced from gasification of municipal solid waste. The carbon monoxide and hydrogen react at high temperatures and high pressures to produce methanol and isobutanol on alkali promoted ZnO and CuO—ZnO based catalysts, with methane and light hydrocarbons as the main by-products. For example, U.S. Pat. No. 5,767,166 discloses a process for producing isobutanol from syngas on alkali promoted Zn—Cr oxide catalysts in one reactor. A similar process is disclosed in CN Pat. Pub. No. 103,272,609 in which alkali and rare earth oxide promoted CuO—ZnO—$ZrO_2$ catalysts were used.

Although the direct isobutanol synthesis from syngas has been extensively investigated, it is often associated with poor isobutanol selectivity and productivity. During operation, lower temperature results in higher methanol selectivity, while higher temperature tends to produce more methane and light hydrocarbons. Consequently, high isobutanol selectivity and yield are difficult to achieve on the alkali promoted ZnO and CuO—ZnO catalysts.

Therefore, it would be desirable to have a process which can overcome the above obstacles and achieve high isobutanol productivity.

DESCRIPTION

Figure 1:
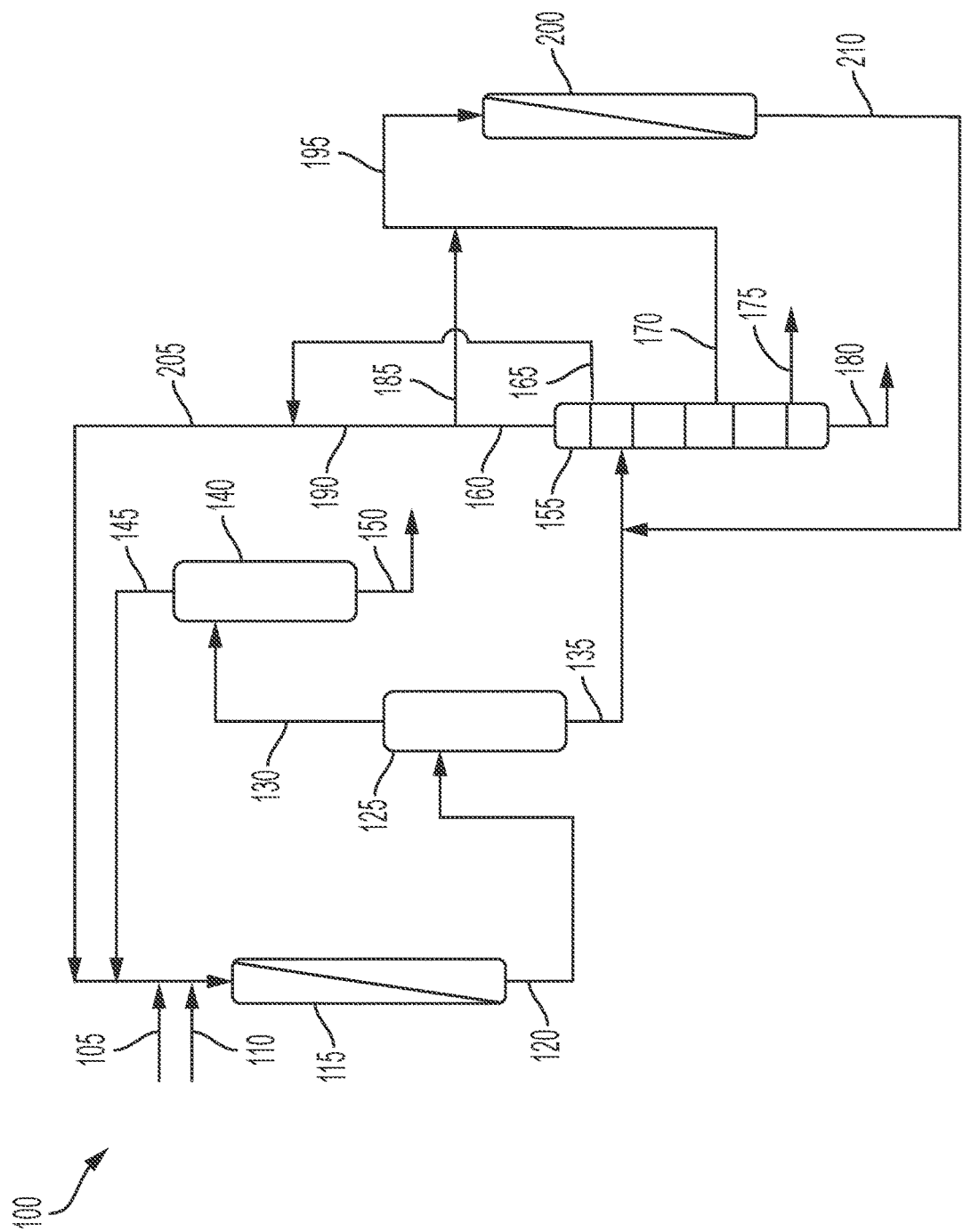
FIG. 1 is an illustration of one embodiment of the process of making isobutanol from ethanol and syngas of the present invention.

A new route for isobutanol synthesis has been developed. It involves a first reaction between ethanol and synthesis gas (syngas) in the presence of a heterogeneous catalyst to produce an alcohol mixture containing methanol, propanol, and butanol. The synthesis gas is a gas mixture consisting hydrogen, carbon monoxide, and sometimes a small amount of carbon dioxide. The products of the first reaction can be separated into one or more streams comprising methanol and propanol. The methanol and propanol from the first reaction are reacted in the presence of a second catalyst to form isobutanol in a second reaction.

The first step of the process is to react ethanol and syngas to produce propanol. The reactions are listed below:

$$C_2H_5OH + 2CO + H_2 = C_3H_7OH + CO_2 \quad (1)$$

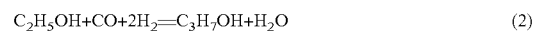
$$C_2H_5OH + CO + 2H_2 = C_3H_7OH + H_2O \quad (2)$$

Methanol is also produced from the syngas as a byproduct:

$$CO + 2H_2 = CH_3OH \quad (3)$$

The reaction mixture from the first reaction zone may be separated in a gas-liquid separator into a gas stream and a liquid stream. The gas stream may comprise of $CO_2$, light hydrocarbons and unreacted CO and $H_2$. The unreacted CO and $H_2$ will be separated and recycled to the first reaction zone.

The liquid bottom stream comprises mixed alcohols which is separated in a liquid separation zone. The liquid separation zone can comprise one or more distillation columns. In one embodiment, the liquid bottom stream is separated into separate streams of methanol, ethanol, propanol, isobutanol and normal butanol. The propanol stream and a part of the methanol stream can be sent to a second reaction zone where they are reacted in the presence of a second catalyst to produce isobutanol. The rest of the methanol stream and the unreacted ethanol stream may be recycled to the first reaction zone. Alternatively, the rest of the methanol stream could be collected as a by-product. The isobutanol stream is collected as a product, while the normal butanol stream is collected as a by-product.

The reaction of propanol and methanol in the second reaction zone may take place in the presence of inert gas (such as $N_2$ and Ar), CO, $H_2$, or combinations thereof. The reaction is shown below:

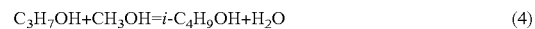
$$C_3H_7OH + CH_3OH = i\text{-}C_4H_9OH + H_2O \quad (4)$$

The reaction mixture produced in the second reaction zone can be recycled to the liquid separation zone for the alcohols separation, recycling and product collection. Alternatively, it may also be introduced into a second liquid separation zone for the alcohols separation. In this embodiment, methanol is either collected as a by-product or recycled to the first reaction zone; ethanol is recycled to the first reaction zone; propanol is recycled to the second reaction zone; and isobutanol is collected as a product.

One aspect of the invention is a process for the production of isobutanol. In one embodiment, the process comprises: reacting ethanol with synthesis gas in a first reaction zone in the presence of a heterogeneous catalyst under first reaction conditions to produce a first reaction mixture comprising methanol and propanol; separating the first reaction mixture into at least a methanol stream comprising methanol, an ethanol stream comprising ethanol, and a propanol stream comprising propanol; introducing the methanol stream and the propanol stream into a second reaction zone; and reacting the methanol and propanol in the second reaction zone in the presence of a second catalyst under second reaction conditions to produce a second reaction mixture comprising isobutanol.

In some embodiments, the heterogeneous catalyst comprises at least one of: an element selected from Cu, Ag, Au, Zn, Rh, Pd, Pt, Cr, Mn, Fe, Co, Ni, Al, Si, Zr, Ti, and combinations thereof; alkali oxides and salts, alkaline earth oxides and salts, rare earth oxides and salts, and combinations thereof.

In some embodiments, the heterogeneous catalyst comprises at least one of alkali oxide doped Cu catalysts, alkali oxide doped Zn catalysts, alkali oxide doped Pd catalysts, and combinations thereof.

In some embodiments, the heterogeneous catalyst comprises a $K_2O/CuZnAlOx$ based catalyst or a $K_2O/CuZnCrOx$ based catalyst.

In some embodiments, the second catalyst comprises at least one element from Groups IA, IIA, IIIA, IVA, VA, IV, IB, IIB, VIB, VIIB, or VIIIB in the Periodic Table, and combinations thereof.

In some embodiments, the second catalyst comprises at least one of: MgO, MgO—$Al_2O_3$, CuO—MgO—$Al_2O_3$, Mg—$PO_4$, Ca—$PO_4$, Sr—$PO_4$, alkali oxides doped zeolites, and combinations thereof.

In some embodiments, separating the first reaction mixture into at least the methanol stream, the ethanol stream, and the propanol stream comprises: separating the first reaction mixture in a gas-liquid separation zone into an overhead gas stream and a liquid bottom stream comprising at least methanol, ethanol, and propanol; separating the liquid bottom stream in a liquid separation zone into at least the methanol stream, the ethanol stream, the propanol stream, an isobutanol stream comprising isobutanol, and a normal butanol stream comprising normal butanol.

In some embodiments, the process further comprises: separating the overhead gas stream into a first gas stream comprising $CO_2$, and light hydrocarbons, and a recycle synthesis gas stream comprising CO and $H_2$; and recycling the recycle synthesis gas stream to the first reaction zone.

In some embodiments, separating the liquid bottom stream comprises using an adsorption process, or a distillation process.

In some embodiments, the second reaction mixture further comprises unreacted methanol and unreacted propanol, and further comprising: recycling the second reaction mixture to the liquid separation zone.

In some embodiments, the second reaction mixture further comprises unreacted methanol and unreacted propanol, and further comprising: separating the second reaction mixture in a second liquid separation zone into an unreacted methanol stream comprising unreacted methanol, an unreacted propanol stream comprising unreacted propanol, a second isobutanol stream comprising isobutanol, and a second normal butanol stream comprising normal butanol; and optionally combining the isobutanol stream with the second isobutanol stream.

In some embodiments, the process further comprises: recycling the unreacted methanol stream to the first reaction zone; and recycling the unreacted propanol stream to the second reaction zone.

In some embodiments, the process further comprises: recycling the ethanol stream to the first reaction zone.

In some embodiments, the first reaction conditions comprise at least one of: a temperature in a range of about 200° C. to about 500° C.; a pressure in a range of about 0.1 to about 30 MPa; 0.1-50 mol % ethanol and balance synthesis gas with a ratio of $H_2$ to CO in a range of about 5:1 to about 1:5; or a gas hourly space velocity in a range of about 100 to about 500,000 liters of gas per kg of catalyst per hr (L/kg-h).

In some embodiments, the second reaction conditions comprise at least one of: a temperature in a range of about 100° C. to about 500° C.; a pressure in a range of about 0.1 to about 15 MPa; 0.1-99 mol % methanol and 0.1-99 mol % propanol; or a gas hourly space velocity in a range of about 100 to about 300,000 liters of gas per kg of catalyst per hr (L/kg-h).

Another aspect of the invention is a process for the production of isobutanol. In one embodiments, the process comprises: reacting ethanol with synthesis gas in a first reaction zone in the presence of a heterogeneous catalyst under first reaction conditions to produce a first reaction mixture comprising methanol and propanol; separating the first reaction mixture into an overhead gas stream and a liquid bottom stream comprising at least methanol, ethanol, propanol, isobutanol, and normal butanol; separating the liquid bottom stream in a liquid separation zone into at least a methanol stream comprising methanol, an ethanol stream comprising ethanol, a propanol stream comprising propanol, an isobutanol stream comprising isobutanol, and a normal butanol stream comprising normal butanol; introducing at least a part of the methanol stream and the propanol stream into a second reaction zone; reacting methanol and propanol in the second reaction zone in the presence of a second catalyst under second reaction conditions to produce a second reaction mixture comprising isobutanol.

In some embodiments, the process further comprises: recycling the second reaction mixture to the liquid separation zone; and optionally at least one of: recycling the ethanol stream to the first reaction zone; and recycling a second part of the methanol stream to the first reaction zone.

In some embodiments, the process further comprises: separating the second reaction mixture in a second liquid separation zone into an unreacted methanol stream comprising unreacted methanol, an unreacted propanol stream comprising unreacted propanol, a second isobutanol stream comprising isobutanol, and a second normal butanol stream comprising normal butanol.

In some embodiments, the process further comprises: separating the overhead gas stream into a first gas stream comprising $CO_2$, and light hydrocarbons, and a recycle synthesis gas stream comprising CO and $H_2$; and recycling the recycle synthesis gas stream to the first reaction zone.

In some embodiments, the first reaction conditions comprise at least one of: a temperature in a range of about 200° C. to about 500° C.; a pressure in a range of about 0.1 to about 30 MPa; 0.1-50 mol % ethanol and balance syngas with a ratio of $H_2$ to CO in a range of about 5:1 to about 1:5; or a gas hourly space velocity in a range of about 100 to about 500,000 liters of gas per kg of catalyst per hr (L/kg-h); or wherein the second reaction conditions comprise at least one of: a temperature in a range of about 100° C. to about 500° C.; a pressure in a range of about 0.1 to about 15 MPa;

0.1-99 mol % methanol and 0.1-99 mol % propanol; or a gas hourly space velocity in a range of about 100 to about 300,000 liters of gas per kg of catalyst per hr (L/kg-h).

FIG. 1 illustrates one embodiment of the process 100 for producing isobutanol. An ethanol stream 105 and a syngas stream 110 are sent to the first reaction zone 115, which includes at least one reactor and associated equipment.

Any suitable source of ethanol can be used. Ethanol is conventionally produced by fermentation of sugar and starch, and by ethylene hydration. In addition, other processes, such as fermentation of syngas and conversion of biomass to ethanol, are being commercialized. With the rapid technology development, ethanol can be produced from many various feedstocks, such as traditional crop or fossil feedstocks, whole lignocellulosic biomass, and waste materials. This diversification of the feedstocks for ethanol production will allow the demand for ethanol not to compete with food.

Any suitable source of syngas can be used. The syngas can be produced from reforming, partial oxidation of natural gas and light hydrocarbons, or gasification of coal or biomass at high temperatures. It can also be produced from gasification of municipal solid waste. Therefore, this process can be applied to the processes of converting coal, natural gas, biomass, and/or waste to isobutanol. The syngas typically has a molar ratio of $H_2$ to CO in a range of about 5:1 to about 1:5, or about 3:1 to about 1:3

The first reaction zone 115 typically contains 0.1-50 mol % ethanol and 50-99.9 mol % synthesis gas, or 1-25 mol % ethanol and 75-99 mol % synthesis gas. The ethanol and syngas react in the presence of a heterogeneous catalyst to produce a first reaction mixture comprising methanol and propanol. The first reaction mixture can also comprise butanol, $CO_2$, light hydrocarbons, $H_2O$ and unreacted ethanol and syngas.

Suitable catalysts for the first reaction include, but are not limited to, Cu, Ag, Au, Zn, Rh, Pd, Pt, Cr, Mn, Fe, Co, Ni, Al, Si, Zr, Ti, alkali oxides and salts, alkaline earth oxides and salts, rare earth oxides and salts, or combinations thereof. In some embodiments, alkali oxide promoted Cu catalysts, alkali oxide promoted Zn catalysts, and alkali oxide promoted Pd catalysts are used. One example of a suitable catalyst is a $K_2O/CuZnAlOx$ based catalyst.

The reaction conditions for the first reaction zone 115 may comprise at least one of: a reaction temperature in the range of about 200° C. to about 500° C., or 250° C. to 450° C.; a pressure in the range of about 0.1 to about 30 MPa, or 0.5 to 15 MPa; or a gas hourly space velocity in a range of about 100 to about 500,000 or 1000 to 200,000 liters of gas per kg of catalyst per hr (L/kg-h).

The first reaction mixture 120 from the first reaction zone may be sent to gas-liquid separation zone 125 and separated into an overhead gas stream 130 and a liquid bottom stream 135. Suitable gas-liquid separation zones 125 include, but are not limited to, condensation tanks and reactors.

The overhead gas stream 130 typically contains one or more of $H_2$, CO, $CO_2$, and light hydrocarbons. The overhead gas stream 130 can be separated in a gas separation zone 140 into a recycle synthesis gas stream 145 comprising $H_2$ and CO, and a gas stream 150 comprising $CO_2$ and light hydrocarbons. The recycle synthesis gas stream 145 can be recycled to the first reaction zone 115. The gas stream 150 can be used as a fuel gas to provide energy for the ethanol conversion to isobutanol process. Suitable gas separation zones 140 include, but are not limited to, membrane separation process and adsorption-desorption process.

The liquid bottom stream 135 typically comprises methanol, ethanol, propanol, iso-butanol, and normal butanol. The liquid bottom stream 135 can be separated in a liquid separation zone 155. Suitable liquid separation zones 155 include, but are not limited to, adsorption zones comprising one or more adsorption beds, and distillation zones comprising one or more distillation columns.

The liquid bottom stream 135 can be separated into a methanol stream 160 comprising methanol, an ethanol stream 165 comprising ethanol, a propanol stream 170 comprising propanol, an isobutanol stream 175 comprising isobutanol, and a normal butanol stream 180 comprising normal butanol in one embodiment. The methanol stream 160 may comprise at least 50% methanol, or at least 60%, or at least 70%, or at least 80%, or at least 85%, or at least 90%, or at least 95%, or at least 98%, or at least 99%. The ethanol stream 165 may comprise at least 50% ethanol, or at least 60%, or at least 70%, or at least 80%, or at least 85%, or at least 90%, or at least 95%, or at least 98%, or at least 99%. The propanol stream 170 may comprise at least 50% propanol, or at least 60%, or at least 70%, or at least 80%, or at least 85%, or at least 90%, or at least 95%, or at least 98%, or at least 99%. The isobutanol stream 175 may comprise at least 50% isobutanol, or at least 60%, or at least 70%, or at least 80%, or at least 85%, or at least 90%, or at least 95%, or at least 98%, or at least 99%. The normal butanol stream 180 may comprise at least 50% normal butanol, or at least 60%, or at least 70%, or at least 80%, or at least 85%, or at least 90%, or at least 95%, or at least 98%, or at least 99%.

The methanol stream 160 can be split into two parts 185, 190. The first part 185 of the methanol stream 160 and the propanol stream 170 can be mixed to produce a methanol-propanol stream 195. The propanol to methanol molar ratio can be adjusted to meet the needs in the second reaction zone 200.

The second part 190 of the methanol stream 160 can be collected as a byproduct (not shown) or mixed with the ethanol stream 165 to form a methanol-ethanol stream 205. The methanol-ethanol stream 205 could be recycled to the first reaction zone 115.

The isobutanol stream 175 is collected as a product, while the normal butanol stream 180 is collected as a byproduct.

The methanol-propanol stream 195 can be sent to the second reaction zone 200 where they are reacted in the presence of a second catalyst to produce a second reaction mixture 210 comprising isobutanol. There can be 0.1-99.9 mol % methanol and 0.1-99.9 mol % propanol, or 5-95 mol % methanol and 5-95 mol % propanol, or 10-90 mol % methanol and 10-90 mol % propanol, or 20-80 mol % methanol and 20-80 mol % propanol, or 25-75 mol % methanol and 25-75 mol % propanol, or 30-75 mol % methanol and 25-70 mol % propanol, or 40-75 mol % methanol and 25-60 mol % propanol, or 50-75 mol % methanol and 25-50 mol % propanol in the second reaction zone 200. The second reaction mixture 210 may also contain water, unreacted methanol, and unreacted propanol.

The second reaction may take place in the present of inert gas (such as $N_2$ and Ar), CO, $H_2$, or combinations thereof.

The second catalyst comprises at least one element from Groups IA, IIA, IIIA, IVA, VA, IV, IB, IIB, VIB, VIIB, and VIIIB of the Periodic Table. Suitable catalysts include, but are not limited to, MgO, MgO—$Al_2O_3$, CuO—MgO—$Al_2O_3$, Mg—$PO_4$, Ca—$PO_4$, Sr—$PO_4$, alkali zeolites, or combinations thereof. The second catalyst can be heterogeneous or homogeneous.

The second reaction conditions for the second reaction zone 200 comprise one or more of: a temperature in the range of 100 to 500° C., or 150 to 450° C.; a pressure in the range of 0.1 to about 15 MPa, or 0.1 to 10 MPa; or a gas hourly space velocity in a range of about 100 to about 300,000, or 1000 to about 150,000 liters of gas per kg of catalyst per hr (L/kg-h).

The second reaction mixture 210 comprising mainly butanol and unreacted methanol and propanol from the second reaction zone 200 can be sent to the liquid separation zone 155.

Figure 2:
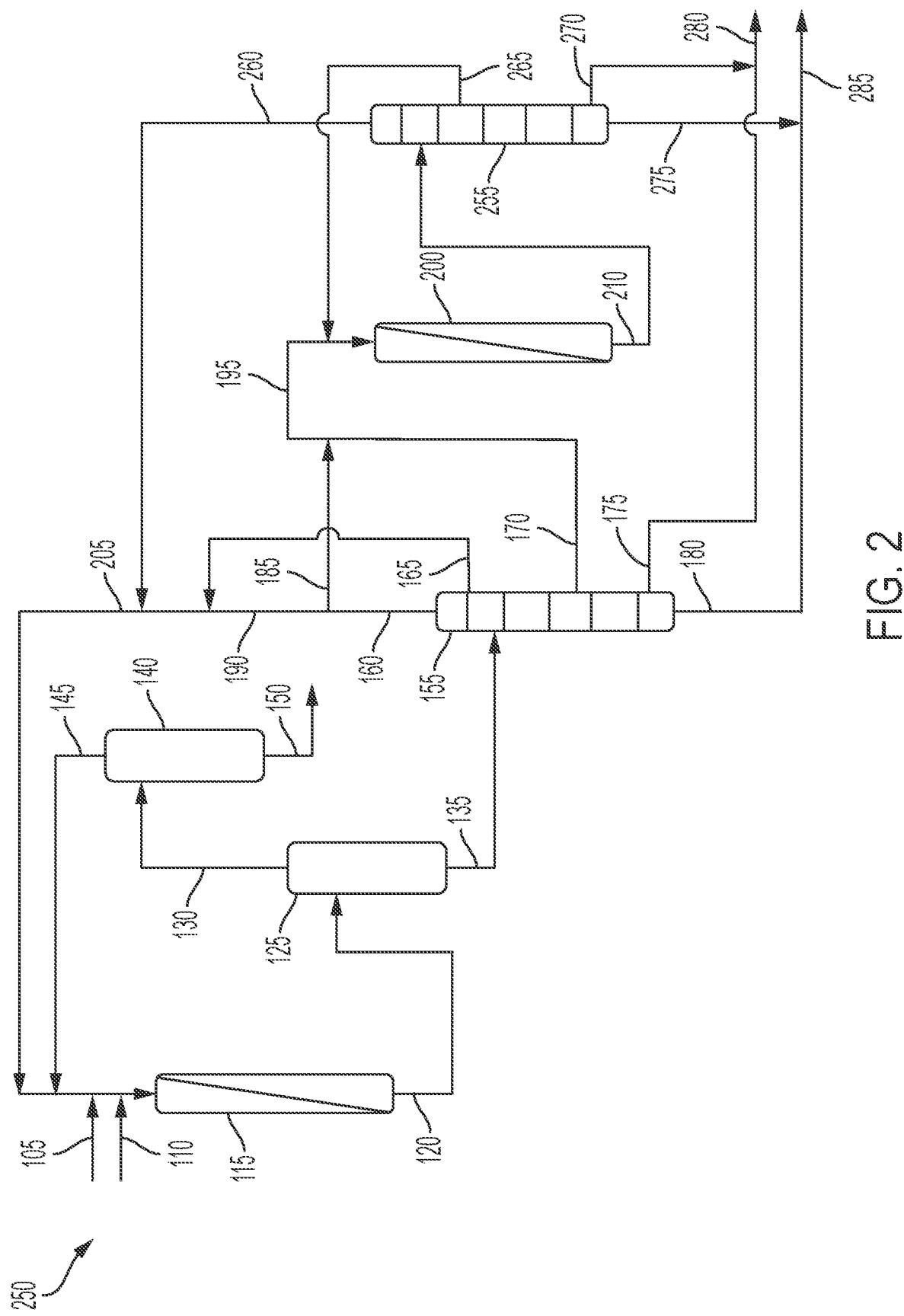
FIG. 2 is an illustration of another embodiment of the process of making isobutanol from ethanol and syngas of the present invention.

FIG. 2 illustrates another embodiment of the process 250 for producing isobutanol. The same numbers are used to identify corresponding streams and equipment as in FIG. 1.

In this embodiment, the second reaction mixture 210 from the second reaction zone 200 is sent to a second liquid separation zone 255. Suitable second liquid separation zones 255 include, but are not limited to, adsorption zones comprising one or more adsorption beds, and distillation zones comprising one or more distillation columns.

The second reaction mixture 210 is separated into a second methanol stream 260, a second propanol stream 265, a second isobutanol stream 270, and a second normal butanol stream 275. The second methanol stream 260 may comprise at least 50% methanol, or at least 60%, or at least 70%, or at least 80%, or at least 85%, or at least 90%, or at least 95%, or at least 98%, or at least 99%. The second propanol stream 265 may comprise at least 50% propanol, or at least 60%, or at least 70%, or at least 80%, or at least 85%, or at least 90%, or at least 95%, or at least 98%, or at least 99%. The second isobutanol stream 270 may comprise at least 50% isobutanol, or at least 60%, or at least 70%, or at least 80%, or at least 85%, or at least 90%, or at least 95%, or at least 98%, or at least 99%. The second normal butanol stream 275 may comprise at least 50% normal butanol, or at least 60%, or at least 70%, or at least 80%, or at least 85%, or at least 90%, or at least 95%, or at least 98%, or at least 99%.

The second methanol stream 260 can be combined with methanol-ethanol stream 205 and sent to the first reaction zone 115.

The second propanol stream 265 is combined with methanol-propanol stream 195 and sent to the second reaction zone 200.

The second isobutanol stream 270 is combined with isobutanol stream 175 forming combined isobutanol stream 280. Combined isobutanol stream 280 is collected as a product.

The second normal butanol stream 275 is combined with normal butanol stream 180 forming combined normal butanol stream 285, which is collected as a byproduct.

EXAMPLES

Example 1

A CuO—ZnO-$Al_2O_3$ catalyst was prepared with conventional co-precipitation method. Next $K_2O$ was impregnated on the surface with incipient wetness impregnation. The catalyst had a composition of 3% $K_2O$, 62% CuO, 25% ZnO and 10% $Al_2O_3$. The catalyst was tested in a tubular reactor under the conditions of 340° C., 100 atm, 43% $H_2$, 43% $CO_3$ 5% $C_2H_5OH$, 9% $N_2$, and gas hourly space velocity of 4,000 ml/g-h. 33% CO conversion and 83% ethanol conversion were achieved. The yields of methanol, propanol and isobutanol were 201, 173 and 24 g/kg-h, respectively. It is clear that ethanol was mainly converted to propanol (173 g/kg-h) by reacting with syngas.

Example 2

A CuO—ZnO—$Cr_2O_3$ catalyst was prepared with conventional co-precipitation method. Next $K_2O$ was impregnated on the surface with incipient wetness impregnation. The catalyst had a composition of 3% $K_2O$, 58% CuO, 30% ZnO and 9% $Cr_2O_3$. The catalyst was tested in a tubular reactor under the conditions of 370° C., 100 atm, 43.5% $H_2$, 43.5% $CO_3$ 3.5% $C_2H_5OH$, 9.5% $N_2$, and gas hourly space velocity of 4,000 ml/g-h. 32% CO conversion and 93% ethanol conversion were achieved. The yields of methanol, propanol, isobutanol and n-butanol were 89, 118, 51 and 16 g/kg-h, respectively. It is clear that ethanol was mainly converted to propanol (118 g/kg-h) by reacting with syngas.

Example 3

A CuO—MgO-$Al_2O_3$ catalyst was prepared with conventional co-precipitation method. The catalyst had a composition of 0.1% CuO, 61.2% MgO and 38.7% $Al_2O_3$. The catalyst was tested in a tubular reactor under the conditions of 387° C., 1 atm, 7.8% $C_3H_7OH$, 41.1% $CH_3OH$, balance $N_2$ and gas hourly space velocity of 4,000 ml/g-h. 85% $C_3H_7OH$ conversion and 40% $CH_3OH$ conversion were achieved. Isobutanol yield was 352 g/kg-h. It is clear that propanol was converted to isobutanol by reacting with methanol.

Example 4

A CuO—MgO-$Al_2O_3$ catalyst was prepared with conventional co-precipitation method. The catalyst had a composition of 16.7% CuO, 51.0% MgO and 32.3% $Al_2O_3$. The catalyst was tested in a tubular reactor under the conditions of 322° C., 1 atm, 7.8% $C_3H_7OH$, 41.1% $CH_3OH$, balance $N_2$ and gas hourly space velocity of 4,000 ml/g-h. 88% $C_3H_7OH$ conversion and 54% $CH_3OH$ conversion were achieved. Isobutanol yield was 257 g/kg-h. It is clear that propanol was converted to isobutanol by reacting with methanol.

As used herein, the term "zone" refers to an area including one or more equipment items. A zone may include one or more sub-zones. Equipment items can include one or more reactors or reactor vessels, heaters, exchangers, pipes, pumps, compressors, and controllers, for example. Additionally, an equipment item, such as a reactor, dryer, or vessel, may include one or more zones or sub-zones.

As used herein, the term "about" means with 10% of the value, or within 5%, or within 1%.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A process for the production of isobutanol comprising:
reacting ethanol with synthesis gas in a first reaction zone in the presence of a heterogeneous catalyst under first reaction conditions to produce a first reaction mixture comprising methanol and propanol;
separating the first reaction mixture into at least a methanol stream comprising methanol, an ethanol stream comprising ethanol, and a propanol stream comprising propanol;
introducing the methanol stream and the propanol stream into a second reaction zone; and
reacting the methanol and propanol in the second reaction zone in the presence of a second catalyst under second reaction conditions to produce a second reaction mixture comprising isobutanol.

2. The process of claim 1 wherein the heterogeneous catalyst comprises at least one of: an element selected from Cu, Ag, Au, Zn, Rh, Pd, Pt, Cr, Mn, Fe, Co, Ni, Al, Si, Zr, Ti, and combinations thereof; alkali oxides and salts, alkaline earth oxides and salts, rare earth oxides and salts, and combinations thereof.

3. The process of any one of claims 1 2 claim 1 wherein the heterogeneous catalyst comprises at least one of alkali oxide doped Cu catalysts, alkali oxide doped Zn catalysts, alkali oxide doped Pd catalysts, and combinations thereof.

4. The process of claim 1 wherein the heterogeneous catalyst comprises a $K_2O/CuZnAlOx$ or a $K_2O/CuZnCrOx$ based catalyst.

5. The process of claim 1 wherein the second catalyst comprises at least one element from Groups IA, IIA, IIIA, IVA, VA, IV, IB, IIB, VIB, VIIB, or VIIIB in the Periodic Table, and combinations thereof.

6. The process of claim 1 wherein the second catalyst comprises at least one of: MgO, MgO—$Al_2O_3$, CuO- MgO-$Al_2O_3$, Mg-$PO_4$, Ca-$PO_4$, Sr-$PO_4$, alkali oxides doped zeolites, and combinations thereof.

7. The process of claim 1 wherein separating the first reaction mixture into at least the methanol stream, the ethanol stream, and the propanol stream comprises:
separating the first reaction mixture in a gas-liquid separation zone into an overhead gas stream and a liquid bottom stream comprising at least methanol, ethanol, and propanol;
separating the liquid bottom stream in a liquid separation zone into at least the methanol stream, the ethanol stream, the propanol stream, an isobutanol stream comprising isobutanol, and a normal butanol stream comprising normal butanol.

8. The process of claim 7 further comprising:
separating the overhead gas stream into a first gas stream comprising $CO_2$, and light hydrocarbons, and a recycle synthesis gas stream comprising CO and $H_2$; and
recycling the recycle synthesis gas stream to the first reaction zone.

9. The process of claim 7 wherein separating the liquid bottom stream comprises using an adsorption process, or a distillation process.

10. The process of claim 7 wherein the second reaction mixture further comprises unreacted methanol and unreacted propanol, and further comprising:
recycling the second reaction mixture to the liquid separation zone.

11. The process of claim 7 wherein the second reaction mixture further comprises unreacted methanol and unreacted propanol, and further comprising:
separating the second reaction mixture in a second liquid separation zone into an unreacted methanol stream comprising unreacted methanol, an unreacted propanol stream comprising unreacted propanol, a second isobutanol stream comprising isobutanol, and a second normal butanol stream comprising normal butanol; and
optionally combining the isobutanol stream with the second isobutanol stream.

12. The process of claim 11 further comprising:
recycling the unreacted methanol stream to the first reaction zone; and
recycling the unreacted propanol stream to the second reaction zone.

13. The process of claim 1 further comprising:
recycling the ethanol stream to the first reaction zone.

14. The process of claim 1 wherein the first reaction conditions comprise at least one of: a temperature in a range of about 200° C. to about 500° C.; a pressure in a range of about 0.1 to about 30 MPa; 0.1-50 mol % ethanol and balance synthesis gas with a ratio of $H_2$ to CO in a range of about 5:1 to about 1:5; or a gas hourly space velocity in a range of about 100 to about 500,000 liters of gas per kg of catalyst per hr (L/kg-h).

15. The process of claim 1 wherein the second reaction conditions comprise at least one of: a temperature in a range of about 100° C. to about 500° C.; a pressure in a range of about 0.1 to about 15 MPa; 0.1-99 mol % methanol and 0.1-99 mol % propanol; or a gas hourly space velocity in a range of about 100 to about 300,000 liters of gas per kg of catalyst per hr (L/kg-h).

16. A process for the production of isobutanol comprising:
reacting ethanol with synthesis gas in a first reaction zone in the presence of a heterogeneous catalyst under first reaction conditions to produce a first reaction mixture comprising methanol and propanol;
separating the first reaction mixture into an overhead gas stream and a liquid bottom stream comprising at least methanol, ethanol, propanol, isobutanol, and normal butanol;
separating the liquid bottom stream in a liquid separation zone into at least a methanol stream comprising methanol, an ethanol stream comprising ethanol, a propanol stream comprising propanol, an isobutanol stream comprising isobutanol, and a normal butanol stream comprising normal butanol;
introducing at least a part of the methanol stream and the propanol stream into a second reaction zone;
reacting methanol and propanol in the second reaction zone in the presence of a second catalyst under second reaction conditions to produce a second reaction mixture comprising isobutanol.

17. The process of claim 16 further comprising:
recycling the second reaction mixture to the liquid separation zone; and
optionally at least one of:
recycling the ethanol stream to the first reaction zone; and
recycling a second part of the methanol stream to the first reaction zone.

18. The process of claim 16 further comprising:
separating the second reaction mixture in a second liquid separation zone into an unreacted methanol stream comprising unreacted methanol, an unreacted propanol stream comprising unreacted propanol, a second isobutanol stream comprising isobutanol, and a second normal butanol stream comprising normal butanol.

19. The process of claim 16 further comprising:

separating the overhead gas stream into a first gas stream comprising $CO_2$, and light hydrocarbons, and a recycle synthesis gas stream comprising CO and $H_2$; and recycling the recycle synthesis gas stream to the first reaction zone.

20. The process of claim 16:

wherein the first reaction conditions comprise at least one of: a temperature in a range of about 200° C. to about 500° C.; a pressure in a range of about 0.1 to about 30 MPa; 0.1-50 mol % ethanol and balance syngas with a ratio of $H_2$ to CO in a range of about 5:1 to about 1:5; or a gas hourly space velocity in a range of about 100 to about 500,000 liters of gas per kg of catalyst per hr (L/kg-h); or wherein the second reaction conditions comprise at least one of: a temperature in a range of about 100° C. to about 500° C.; a pressure in a range of about 0.1 to about 15 MPa; 0.1-99 mol % methanol and 0.1-99 mol % propanol; or a gas hourly space velocity in a range of about 100 to about 300,000 liters of gas per kg of catalyst per hr (L/kg-h).

\* \* \* \* \*